Jan. 26, 1954  A. P. GROVER ET AL  2,666,950
CURING PRESS MECHANISM
Filed Sept. 23, 1950  2 Sheets-Sheet 1
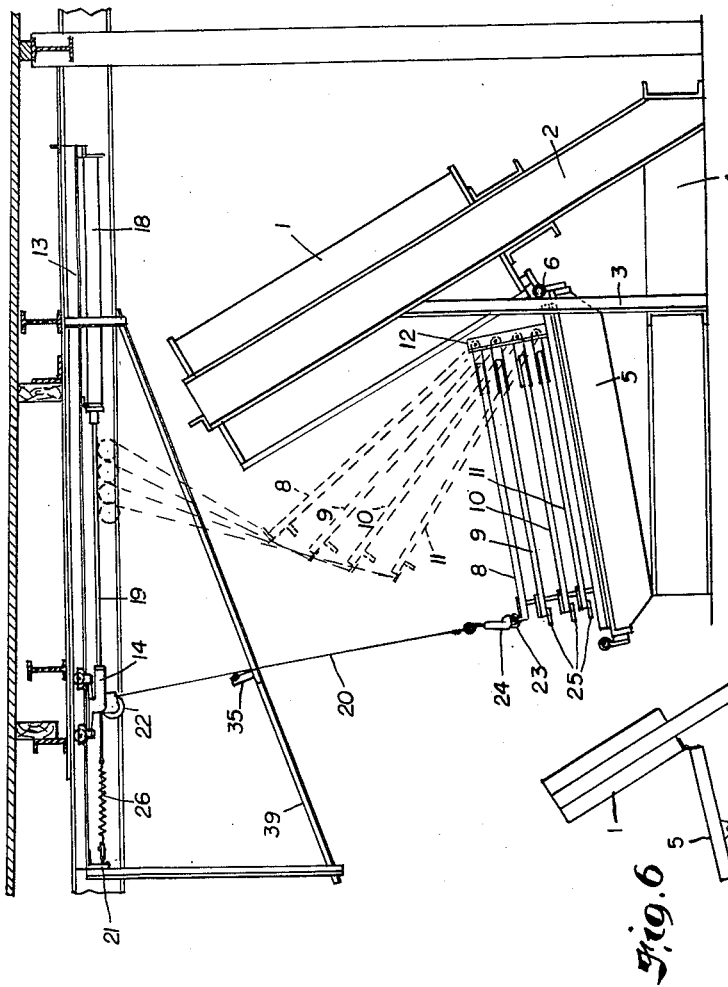
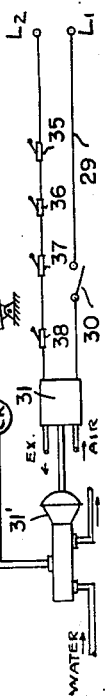
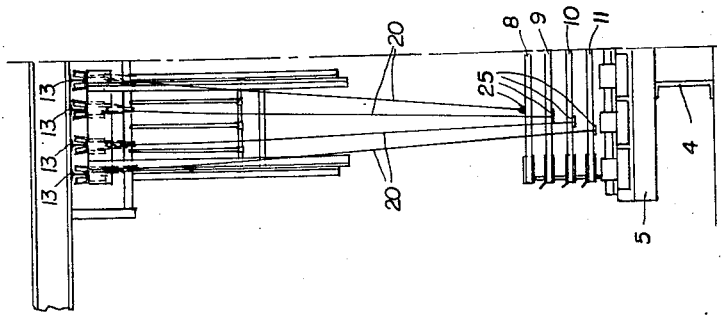
INVENTORS
ANTHONY P. GROVER +
WALLACE M. MILDEN
BY
Oberlin & Limbach
ATTORNEYS.

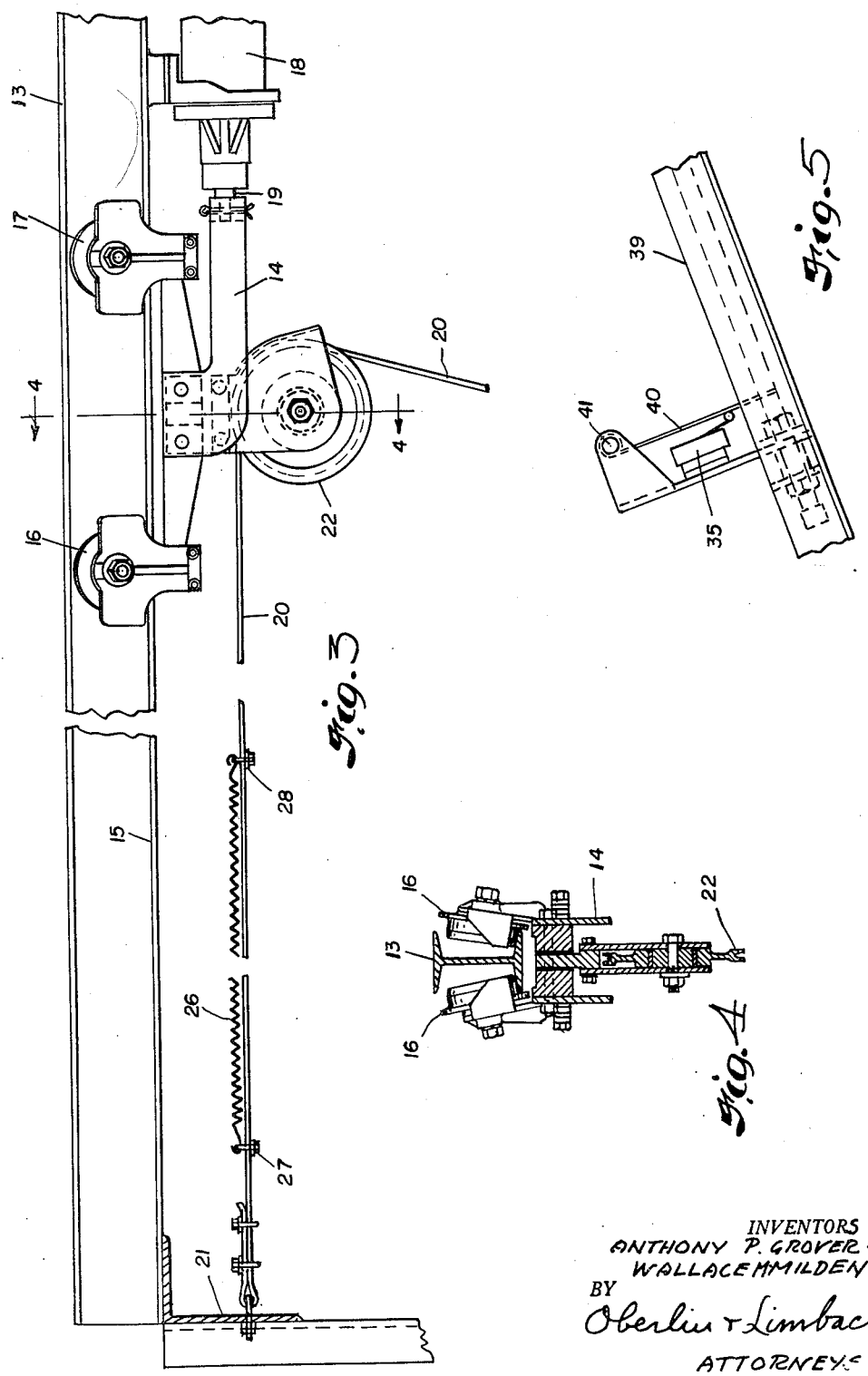

Patented Jan. 26, 1954

2,666,950

UNITED STATES PATENT OFFICE 2,666,950

CURING PRESS MECHANISM

Anthony P. Grover, Willoughby, and Wallace M. Milden, Cleveland, Ohio, assignors, by mesne assignments, to The Eagle-Picher Company, Cincinnati, Ohio, a corporation of Ohio Application September 23, 1950, Serial No. 186,388

8 Claims. (Cl. 18—17)

This invention relates as indicated to curing press mechanism and, more particularly, to a curing press or oven designed for the curing of rubber mats and the like.

In one form of curing oven which has been in commercial use for some time and has proven very satisfactory, the oven proper comprises a large steam chest inclined at an angle of about 30° to the vertical, the lower of the two inclined sides thereof being openable by means of a door hingedly connected thereto at the lower edge thereof. Such door is thus adapted to swing downwardly and outwardly to a generally horizontal position with the racks carrying the molded rubber mats or the like resting thereon. A series of large generally flat molds will ordinarily be stacked one upon the other and pivotally connected to an extension of such door so that a plurality of mats may be molded and cured simultaneously. It has been conventional to provide elaborate counterbalancing means for such pivotally mounted "leaves," ordinarily comprising large tension springs contained within the curing chest and secured to a lateral edge of each "leaf" respectively. When the door of the chest has been dropped down, with the rack of mold leaves resting thereon, an operator is thus enabled to swing up such leaves one at a time in order to expose the next underlying mold and permit removal of a molded and cured mat thereon. Such molds are then cleaned and sheets of uncured rubber stock placed thereon, beginning with the lowermost mold and bringing down the next upper mold leaf in succession until a sheet of uncured stock has been placed on each mold and the mold leaves comprising the complete rack are now stacked one upon the other and resting on the oven door. In this type of curing press, suction is ordinarily applied at the mold surfaces to draw the relatively thin uncured rubber stock against the respective mold surfaces. The oven door is then closed, and steam is admitted to such curing oven or steam chest to cure the molded mats.

As above indicated, curing ovens or presses of the type described are conventional, and the present invention relates only to an improvement in the means employed to support the individual mold leaves when the oven has been opened and the operator wishes to swing such leaves upwardly one at a time about their respective pivots in order to obtain access to the underlying leaves. The tension springs previously employed have been far from satisfactory as means for counterbalancing such leaves so that the operator may readily raise or lower the same. Since the weight of the leaves may not be entirely counterbalanced, it being desired that the same normally rest upon the oven door in open position, a certain amount of physical effort is obviously required on the part of the operator both to open the leaves of the rack and also to bring the same down again to form a stack on such door prior to closing the latter. The spring means employed in the past has also occupied considerable space within the oven or steam chest proper, reducing the space available for the mold leaves themselves and requiring the employment of curing ovens of a size out of proportion to that of the mats cured therein. Being subjected to the repeated action of hot steam, the springs, moreover, tend to fail prematurely and replacement of the same under operating conditions is a nuisance as well as entailing expensive down time. Moreover, it has occasionally happened that the jar of closing the oven door together with the tension of a somewhat too powerful spring has acted to overbalance the uppermost mold leaf of the rack to cause the same to swing upwardly into the rear of the curing chamber where it will jam when the door is next opened.

It is accordingly a primary object of our invention to provide curing press mechanism whereby the individual mold leaves of a rack may be successively elevated and lowered without physical effort on the part of the operator and without danger of injury to either the operator or the apparatus.

A further object is to provide such apparatus which will not take up valuable space within the curing oven proper.

Still another object is to provide such apparatus including control means preventing closing of the oven until all leaves of the rack have been properly positioned.

Other objects of our invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a side elevational view of a conventional curing oven or curing press of the type to which this invention relates and showing the mold leaf lifting means of our invention operatively associated therewith;

Fig. 2 is a front elevational view of a portion of such curing press and our new mechanism;

Fig. 3 is an enlarged fragmentary view of the mechanism shown in the upper part of Fig. 1;

Fig. 4 is a vertical sectional view taken along the line 4—4 on Fig. 3;

Fig. 5 is a detail view of control means for such curing press responsive to the positioning of the mold leaf lifting means; and Fig. 6 is a wiring diagram illustrating one manner of employing such control means.

Referring now more particularly to said annexed drawing and especially Figs. 1-4 thereof, the mechanism of our invention is adapted to be employed in conjunction with a conventional curing press which may comprise a box-like curing chamber 1 supported at an angle of about 30° to the vertical by means of side frame members such as 2 and vertical struts 3 welded to base 4. The downwardly inclined side of such curing chamber is provided with a door 5 hinged at 6 to the lower edge thereof and adapted to make an airtight seal when swung up into closed position. The curing chamber is, of course, provided with the usual steam lines for the purpose of admitting steam thereto to effect the curing of rubber mats or the like therein. A fluid pressure piston-cylinder assembly 7 (only diagrammatically illustrated in Fig. 6) is usually employed to swing door 5 upwardly into closed position. A plurality of mold leaves 8, 9, 10, and 11 are pivotally secured to uprights 12 on the inner side of door 5 adjacent hinge 6, spacer means being provided adjacent the forward edges of such leaves to maintain the latter in generally parallel position as shown in solid line in Figs. 1 and 2. Due to the inclination of curing chamber 1, this relationship of the mold leaves to each other and to door 5 will normally be maintained even when such door is swung up into closed position. The mold leaves are hollow and are provided with a mold surface on their upper sides. When a sheet of uncured rubber stock has been placed on such mold surface, vacuum may be applied to the underside thereof through small apertures in such surface leading to the hollow interior of the leaf to draw the uncured rubber stock into close molding engagement with such surface. As indicated, this form of molding means, the vacuum lines leading thereto and like details, are all old in the art and form no part of this invention.

For the reasons explained above, the usual prior art counterbalancing means employed to facilitate raising and lowering of the individual leaves of the rack by the operator have proven far from satisfactory. To avoid the difficulties previously encountered and to perform certain functions not previously accomplished, we have provided the mechanism described below. A plurality of overhead horizontal monorails 13 are provided above curing chamber 1 transverse to the axis of hinge 6 and equal in number to the number of mold leaves pivotally mounted on door 5.

Since the operating mechanism carried by each such monorail will be identical, only one will be described, particular reference being had to Fig. 3 of the drawing. A carriage 14 is suspended from the lower flange 15 of monorail 13 by means of two pair of rollers 16 and 17 adapted to travel therealong. A fluid pressure piston-cylinder assembly (ordinarily pneumatic) is provided suspended from rail 13 and comprising cylinder 18 and piston 19, the latter being secured to carriage 14.

A small steel cable 20 is secured to a support 21 spaced outwardly from the front of the curing press and after passing over a pulley 22 suspended from carriage 14 hangs downwardly adjacent the outer edge of a mold leaf. As best shown (somewhat diagrammatically) in Fig. 2, these cables 20 from the several pulleys overhead will thus dangle side by side, each being of a length to bring a terminal hook 23 adjacent a respective mold leaf edge. Such hooks will preferably be of the safety type and may be provided with a sliding sleeve hood 24 adapted to guard against unintentional disengagement of such hooks from the eyes 25 secured to the respective mold leaves, preferably adjacent one corner of the latter so that the cables 20 will not obstruct access to the molds by the operator to any great extent.

A tension spring 26 may be secured at its respective ends 27 and 28 to cable 20 adjacent fixed support 21 in order to provide a small loop of slack in such cable when no downward pull is being exerted on the latter. This means that the operator will be required to pull down somewhat on a hook 23 before he can engage the same with an eye 25 of the respective mold leaf. Accordingly, a certain degree of pull will be exerted on such cable and hook when the latter is secured to a mold leaf even when piston 19 is in fully extended position as shown in Fig. 1. When the operator admits air under pressure to cylinder 18 to retract piston 19 therein, it will be seen that carriage 14 will be caused to travel from left to right as viewed in Fig. 1, thereby shortening the length of cable 20 depending from pulley 22 and swinging the respective mold leaf upwardly as shown in dotted line in Fig. 1. The reciprocation of the respective piston-cylinder assemblies will be regulated to avoid interference between the several mold leaves when each has been swung upwardly to the greatest extent possible. It will be noted that not only does reciprocation of carriage 14 cause a lifting pull to be exerted on cable 20, but also the direction of such pull varies as the respective mold leaf is swung upwardly about its pivotal connection with rack uprights 12. Consequently, the direction of pull on cables 20 is always substantially normal to the respective mold leaf, achieving maximum efficiency. It may be readily understood from an inspection of Fig. 1 that if pulley 22 were stationary in the position shown it would be extremely difficult to raise leaf 8 to its dotted line position.

Before closing the curing press, the operator must, of course, lower all of the leaves of the rack to solid line position as shown in Fig. 1 and the hooks 23 must be detached therefrom since otherwise they would jam as the door is closed. To avoid such rather disastrous occurrence, we have provided a control system best shown in Figs. 1, 5, and 6 of the drawing. An electric control circuit 29 may be employed to actuate the fluid pressure mechanism for opening and closing door 5. Such circuit includes a hand control switch 30 adapted when closed (and with the circuit otherwise being closed) to energize solenoid operated spring return air valve 31 which controls air-operated diaphragm valve 31' to admit fluid pressure to line 32 leading to the cylinder of piston-cylinder assembly 7 adapted to swing door 5 upwardly into closed position. A check valve 33 and a flow control valve 34 on a by-pass around such check valve will ensure smooth and uniform opening of such door when switch 30 is opened causing valve 31 to connect line 32 to sump.

A plurality of micro-switches 35, 36, 37, and 38 are included in series in circuit 29 so that such circuit may be closed only when all such micro-switches are closed. Such micro-switches will correspond in number to the number of cables 20 depending therepast, and such switches may be mounted on overhead supports such as strut 39 in position to be engaged by respective cables 20 as the latter depend from pulleys 22. Small wear plates 40 pivotally mounted at 41 adjacent the respective micro-switches will make actual contact with the cables in order to avoid possible damage to the switches. It will thus be seen that, when all the hooks 23 are disengaged from the respective mold leaves and permitted to dangle freely, tension springs 26 will take up a certain amount of slack in cables 20, somewhat elevating such hooks, and such cables will lie against the wear plates 40 of the respective micro-switches closing the latter and setting up circuit 29 so that the operator may now close door 5 of the curing chamber. Only when the cables 20 have been disengaged from their respective mold leaves and are permitted to dangle freely will they engage the respective micro-switches to permit closing of the curing chamber.

It will be seen from the foregoing that we have provided a very convenient means for swinging up the individual mold leaves of an opened curing press of the type employed for the curing of rubber mats and the like, which will be expeditious in operation while relieving the operator of physical strain and effort and which will be entirely safe in operation. Since none of such leaf lifting mechanism is contained within the curing chamber proper, maximum use may be made of the space within the latter. The mechanism requires a minimum of maintenance and repair, not being subjected to the severe operating conditions within the curing chamber, and is adapted to exert its pull in the most effective direction.

Other modes of applying the principle of the invention may be employed, change being made as regards the details described, provided the features stated in any of the following claims or the equivalent of such be employed.

We therefore particularly point out and distinctly claim as our invention:

1. In combination with a curing press having an inclined curing chamber, a door for the lower inclined side of such chamber hingedly mounted at its lower edge for downward opening movement, and a stack of superimposed mold leaves adapted to be supported on the upper surface of such door when the latter has been swung open into generally horizontal position and individually pivotally connected to such door adjacent such hinge for swinging movement about axes parallel to the axis of such hinge, whereby each such mold leaf may be swung up to expose the leaf thereunder, such stack of mold leaves being carried into such chamber by such door when the latter is swung upwardly into closed position; leaf lifting means comprising a plurality of parallel overhead monorails equal in number to the number of mold leaves, said monorails extending generally at right angles to the pivotal connections of such mold leaves, carriages adapted to travel along each said monorail, individual fluid pressure piston-cylinder assemblies operative to reciprocate said respective carriages along said monorails, a pulley mounted on each said carriage for rotation about a horizontal axis, a plurality of cables equal in number to the number of mold leaves secured to a fixed support spaced outwardly from such mold leaves when such door is in open position and passing over said respective pulleys with their free ends dangling adjacent the respective outer edges of said leaves opposite to the edges thereof pivotally connected to said door, a lifting ring on each said leaf adjacent said free ends, a hook on each said free end of said cables adapted to engage a respective ring on such mold leaves, an electric control circuit adapted to control closing of said door, and switch means arranged to be engaged and operated by said cables only when said hooks are disengaged from said lifting rings and said cables therefore hanging freely, operation of said switch means by said cables being effective to set up said control circuit to permit closing of said door.

2. In combination with a curing press having an inclined curing chamber, a door for the lower inclined side of such chamber hingedly mounted at its lower edge for downward opening movement, and a stack of superimposed mold leaves adapted to be supported on the upper surface of such door when the latter has been swung open into generally horizontal position and individually pivotally connected to such door adjacent such hinge for swinging movement about axes parallel to the axis of such hinge, whereby each such mold leaf may be swung up to expose the leaf thereunder, such stack of mold leaves being carried into such chamber by such door when the latter is swung upwardly into closed position; leaf lifting means comprising a plurality of parallel overhead monorails equal in number to the number of mold leaves, said monorails extending generally at right angles to the pivotal connections of such mold leaves, carriages adapted to travel along each said monorail, individual fluid pressure piston-cylinder assemblies operative to reciprocate said respective carriages along said monorails, a pulley mounted on each said carriage for rotation about a horizontal axis, a plurality of cables equal in number to the number of mold leaves secured to a fixed support spaced outwardly from such mold leaves when such door is in open position and passing over said respective pulleys with their free ends dangling adjacent the respective outer edges of said leaves opposite to the edges thereof pivotally connected to said door, means on the free ends of said cables adapted to engage such respective mold leaves individually to elevate the latter upon reciprocation of said respective piston-cylinder assemblies and pulley-supporting carriages, means operative to close such door of such curing chamber, and control means rendering said door closing means inoperative when a said cable is still engaged with a mold leaf.

3. In combination with a curing press having a curing chamber, a door for such chamber adapted to swing outwardly and downwardly, and a stack of superimposed mold leaves adapted to rest on the upper surface of such door when the latter has been swung open into generally horizontal position, such mold leaves being individually pivotally connected to such door for upward swinging movement whereby access may be had to underlying leaves; individual leaf lifting means comprising a plurality of parallel overhead guideways extending generally at right angles to such pivotal connections of such mold leaves, pulleys mounted on said guideways for reciprocation therealong, means operative to reciprocate said pulleys along said guideways, a plurality of cables secured to supporting means spaced outwardly from such mold leaves when such door is in open position and passing over said respective pulleys with their free ends hanging adjacent the edges of such leaves opposite to the points of pivotal mounting of the latter, and means for releasably securing such free ends of said cables to such respective mold leaves, whereby each such leaf may be swung upwardly upon reciprocation of a said respective pulley, along its guideway, such reciprocation thereby serving to shorten the length of cable depending from said pulley and to transmit a lifting pull therethrough maintained generally normal to such leaf.

4. In combination with a curing press having a curing chamber, a door for such chamber adapted to swing outwardly and downwardly, and a stack of superimposed mold leaves adapted to rest on the upper surface of such door when the latter has been swung open into generally horizontal position, such mold leaves being individually pivotally connected to such door for upward swinging movement, whereby access may be had to underlying leaves; individual leaf lifting means comprising a plurality of depending cables hanging adjacent such leaves opposite the points of pivotal mounting of the latter, means for releasably securing said cables to such respective mold leaves, and overhead traveling means operative to pull on said cables to swing such leaves upwardly and adapted to travel in a direction generally toward such points of pivotal mounting of such leaves to maintain such pull generally normal thereto.

5. In combination with a curing press having a curing chamber, a door for such chamber adapted to swing outwardly and downwardly, and a stack of superimposed mold leaves adapted to rest on the upper surface of such door when the latter has been swung open into generally horizontal position, such mold leaves being individually pivotally connected to such door for upward swinging movement, whereby access may be had to underlying leaves; individual leaf lifting means comprising a plurality of depending cables hanging adjacent such leaves opposite the points of pivotal mounting of the latter, means for releasably securing said cables to such respective mold leaves, overhead traveling means operative to pull on said cables to swing such leaves upwardly and adapted to travel in a direction generally at right angles toward the axes of such points of pivotal mounting of such leaves to maintain such pull generally normal to the latter, means operative to close such door, control means normally operative to render said door closing means inoperative, and switch means arranged to be engaged and operated by said cables hanging detached from said leaves only and operative when so engaged to set up said control means to permit operation of said door closing means.

6. In combination a stack of large generally flat mold leaves pivotally mounted adjacent one edge of the same and means for lifting individual leaves of said stack comprising depending cables adapted to be releasably secured thereto at points spaced from such points of pivotal mounting, means operative to exert a lifting pull on said cables to swing said respective leaves upwardly, means operative to move such stack of mold leaves into a curing chamber, and control means normally operative to render said moving means inoperative but adapted to permit operation of said moving means when engaged by said cables hanging freely detached from said mold leaves.

7. In combination with a curing press having a curing chamber, a door for such chamber adapted to swing outwardly and downwardly, and a stack of superimposed mold leaves adapted to rest on the upper surface of such door when the latter has been swung open into generally horizontal position, such mold leaves being individually pivotally connected to such door for upward swinging movement whereby access may be had to underlying leaves; individual leaf lifting means comprising a plurality of parallel overhead guideways extending generally at right angles to such pivotal connections of such mold leaves, pulleys mounted on said guideways for reciprocation therealong, means operative to reciprocate said pulleys along said guideways, a plurality of cables secured to supporting means spaced outwardly from such mold leaves when such door is in open position and passing over said respective pulleys with their free ends hanging adjacent the edges of such leaves opposite to the points of pivotal mounting of the latter, means for releasably securing such free ends of said cables to such respective mold leaves whereby each such leaf may be swung upwardly upon reciprocation of a said respective pulley along its guideway, such reciprocation thereby serving to shorten the length of cable depending from said pulley and to transmit a lifting pull therethrough maintained generally normal to such leaf; means operative to close such door and thereby carry such stack into such curing chamber, and a control circuit for said door closing means including switches arranged to be engaged respectively and operated by said cables when the latter hang freely only, detached from such leaves, said control circuit being set up to permit closing of said door only when all such switches are thus engaged by said respective cables.

8. In combination with a curing press having a curing chamber, a door for such chamber adapted to swing outwardly and downwardly, and a stack of superimposed mold leaves adapted to rest on the upper surface of such door when the latter has been swung open into generally horizontal position, such mold leaves being individually pivotally connected to such door for upward swinging movement, whereby access may be had to underlying leaves; individual leaf lifting means comprising a plurality of depending cables hanging adjacent such leaves opposite the points of pivotal mounting of the latter, hook means on said cables for releasably securing said cables to such respective mold leaves, resilient tensioning means for said cables adapted to hold said hooks firmly engaged with such respective leaves even when no other lifting force is exerted thereon, and overhead traveling means operative to pull on said cables to swing such leaves upwardly and adapted to travel in a direction generally toward such points of pivotal mounting of such leaves, to maintain such pull generally normal thereto.

ANTHONY P. GROVER.
WALLACE M. MILDEN.

References Cited in the file of this patent
UNITED STATES PATENTS

| Number | Name | Date |
|---|---|---|
| 306,659 | Stewart et al. | Oct. 14, 1884 |
| 1,929,535 | Parker | Oct. 10, 1933 |
| 2,101,508 | Pryale et al. | Dec. 7, 1937 |
| 2,109,908 | Pryale et al. | Mar. 1, 1938 |
| 2,134,364 | Glougie | Oct. 25, 1938 |
| 2,182,833 | Winegar | Dec. 12, 1939 |
| 2,415,014 | Luebbers | Jan. 28, 1947 |
| 2,489,486 | Glynn | Nov. 29, 1949 |